Figure 1:
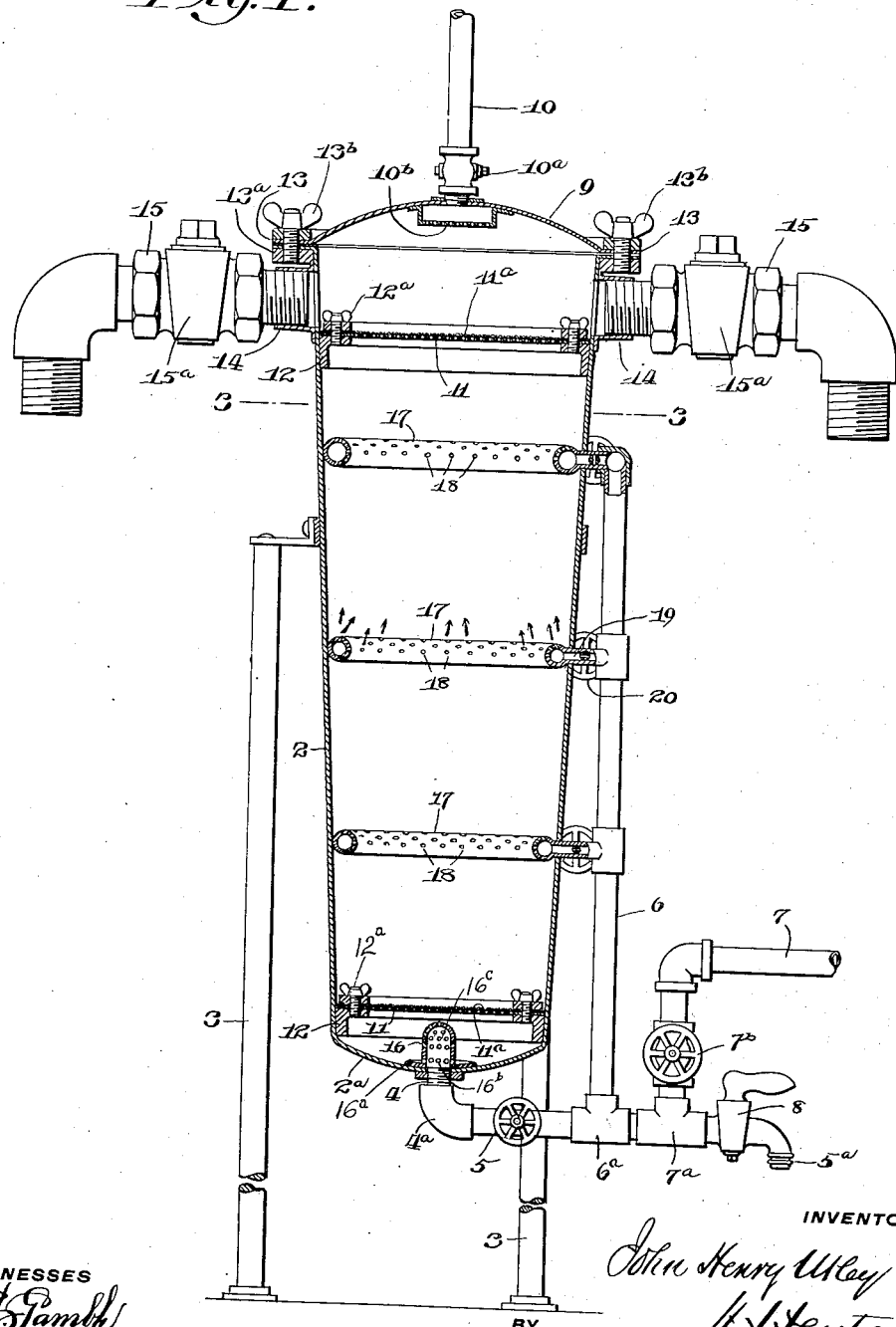

J. H. UTLEY.
BONE BLACK FILTER FOR CLARIFYING GELATIN LIQUORS AND THE LIKE.
APPLICATION FILED AUG. 21, 1909.

961,180.

Patented June 14, 1910.
2 SHEETS—SHEET 1.

J. H. UTLEY.
BONE BLACK FILTER FOR CLARIFYING GELATIN LIQUORS AND THE LIKE.
APPLICATION FILED AUG. 21, 1909.
961,180.
Patented June 14, 1910.
2 SHEETS—SHEET 2.
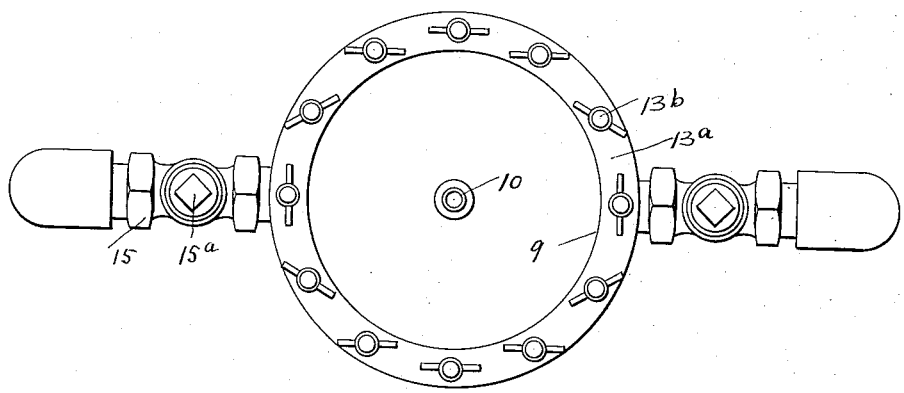
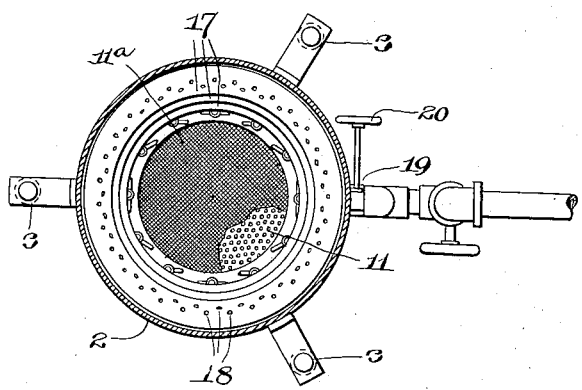
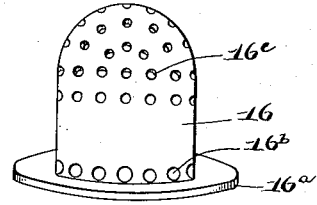
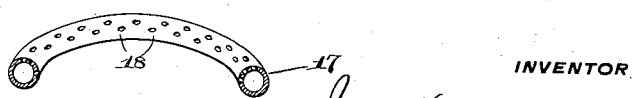
WITNESSES
INVENTOR
John Henry Utley
BY
ATTORNEY

UNITED STATES PATENT OFFICE.

JOHN HENRY UTLEY, OF CAMDEN, NEW JERSEY, ASSIGNOR OF ONE-THIRD TO HENRY JOHN WEBSTER, OF CAMDEN, NEW JERSEY, AND ONE-THIRD TO WILLIAM M. HARDIE, OF PITTSBURG, PENNSYLVANIA.

BONE-BLACK FILTER FOR CLARIFYING GELATIN LIQUORS AND THE LIKE.

961,180. Specification of Letters Patent. Patented June 14, 1910.

Application filed August 21, 1909. Serial No. 514,005.

*To all whom it may concern:*

Be it known that I, JOHN HENRY UTLEY, a subject of the King of Great Britain, residing in the city of Camden, State of New Jersey, have invented certain new and useful Improvements in Bone-Black Filters for Clarifying Gelatin Liquors and the Like, of which the following is a full, clear, and exact description, reference being had to the accompanying drawings, forming a part of this specification.

My invention relates to the art of clarifying and decolorizing gelatin liquors and the like such as glue liquors, glucose and sugar solutions, by means of bone black or animal charcoal, which is commonly employed for such purpose because of its porous and absorbent nature, the method heretofore employed being to filter the gelatin or other liquor to be treated, through a body of ground or granulated bone black held between filter screens in a suitable container vessel; then removing the bone black when "spent", washing and re-burning it, replacing it in the container when so revivified and restored, and repeating the first step of passing a fresh volume of gelatin or other liquor to be treated through the container vessel and through the body of animal bone black so revivified and restored and replaced in the container as before stated.

My present invention hereinafter described and claimed has for its object the provision of an apparatus wherein, as a continuous process, I can preliminarily treat the granulated bone black in initial condition to deprive it of its combined salts and other impurities to render it more efficient in the first instance, then to pass a volume of gelatin or other liquor to be clarified through such purified body of bone black, then to revivify or clean the "spent" bone black without reburning and without removal from the container apparatus, and finally to repeat the second step of passing another volume of gelatin or other liquor through the container vessel and its contained revivified bone black, and so on alternately repeating the second and third steps stated.

To these ends my present invention hereinafter described and claimed consists of an apparatus having the identifying features of construction and mode of operation to accomplish the objects stated, and comprising essentially the container vessel, substantially closed to the atmosphere, preferably of the form of a frustum of an inverted cone, containing filtering devices near its opposite ends, and adapted to be filled with a body of granulated bone black between the same, valve-controlled tubular means to discharge live steam upward through the container and its contents, tubular means to discharge a volume of hot water through the same in the reverse direction; tubular means to lead a volume of gelatin or other liquor to be treated to and from the opposite ends of the container, means within the container, at its basal end, to deflect the entering steam, and preferably with a plurality of interior valve-controlled tubular devices to distribute steam to every part of the container between the filtering plates.

In the accompanying drawings illustrating my said invented apparatus, Figure 1 is an elevation, partly in section; Fig. 2 is a plan view; Fig. 3 is a section on the line 3—3 of Fig. 1; Fig. 4 is an elevation of the steam-deflecting nozzle, detached, and Fig. 5 is a perspective view of a section of one of the perforated steam-distributing tubular rings, detached.

Referring now to said drawings, the container vessel, indicated at 2, may be suitably supported upon legs or standards 3. It is preferably in the form of an inverted frustum of a cone, having an inclination of about 1 to 3, the drawings showing a container which is 12 inches in diameter at base and 36 inches in diameter at top; and it is preferably a tinned copper vessel. As customary in the use of such devices when clarifying hot liquors, such as gelatin, the container should be wrapped with asbestos or other suitable means employed to prevent radiation of contained heat. The container 2 has a base plate $2^a$, integral or otherwise, and preferably curved, as shown; and said base is centrally apertured, to receive the threaded end of a pipe 4 connected by an elbow joint $4^a$ with a horizontally disposed pipe 5. Intermediate the length of the latter it is operatively connected by a sleeve-pipe joint $6^a$ with a vertically-disposed steam pipe 6. Rearward of the same, the horizontal pipe 5 is operatively embraced by another sleeve-joint connection $7^a$ with steam pipe 7 governed by valve $7^b$. The terminal end of pipe 5 is governed by liquid spigot 8. The top end of the container 2 is provided with a removable closing cap 9 centrally apertured to receive a comparatively large inlet pipe 10, governed by a valve 10ª, and below this aperture I prefer to supply a deflecting plate, such as the perforated plate indicated at 10ᵇ to diffuse and spread the incoming hot water and gelatin liquor to be treated, so that it will discharge more evenly over the whole of the filtering device below it, which consists preferably of a perforated plate 11 with superposed screen 11ª both being detachably supported, within the container, by an annular bracket 12, the connection being by thumb-screw 12ª.

The top of the container 2 and the base of the removable closing cap 9 may be supplied each with an annular flange 13, 13ª, whereby they may be detachably connected as by thumb-screw 13ᵇ. The container 2 is supplied near its top and above its filter plates with large steam discharge openings, two being shown in the drawings at 14, 14, each of these receiving the threaded ends of pipe 15, which is governed by valve 15ª. Near the base of the container, another set of filtering devices 11, 11ª, the same as at top, is supported by like means 12, 12ª, as before; and in the space between the same and the base plate 2ª of the container 2 and over the large central aperture therein, is arranged, by its flange 16ª, a cap 16, shown in detached elevation in Fig. 4, and which serves a double purpose; first it is perforated as at 16ᶜ with perforations pointed directly vertical as to some of them and a vertical incline outward as to the remainder, the function being to diffuse the incoming steam and spray it against the whole surface of the lowering filtering device. Above the flange 16ª of this cap 16, is arranged annularly a series of comparatively large holes 16ᵇ, the function of which is to permit the passage of hot water and gelatin liquor treated, from the container into the pipe 5 to be discharged through the nozzle 5ª when, in the operation of the device, it is so desired.

Interiorly of the container 2 is arranged a plurality of annular pipes or tubular rings 17 which are preferably of tinned copper, like the container vessel. The number of these will depend upon the size and height of the container vessel; and these tubular rings, shown in detached view in Fig. 5, are of a diameter to fit close against the inner wall of the container, and are perforated with a series of perforations 18 some pointing perpendicularly and others at one or more inclinations from the perpendicular, the function of each tubular ring and the series of them in conjunction with the basal perforated cap 16, being to diffuse and discharge the incoming steam, discharged through them, as indicated by the arrow in Fig. 1, against every particle of bone-black in the container vessel. Each of these tubular rings 17 is independently connected, by a pipe 19 passing through the wall of the container, said pipe being governed by its own valve 19 and having a sleeve joint connection 20 with the steam-supply pipe 6; hence, the several steam inlets, shown as four in the drawings, are capable of either simultaneous or of independent action as may be desired.

The operation of the apparatus is as follows: Removing temporarily the detachable closing cap 9 and upper filtering device 11, 11ª, the container is filled with ground or granulated animal charcoal or bone black, in the space between the upper and lower filter plates; and said removed parts being replaced, live steam is let into the container through pipe 5, discharged and diffused through perforated cap 16, the several annular perforate pipes 17 being then successively operated, preferably beginning with the top tubular ring, and the steam thus reaching every particle of bone black is finally discharged through outlet pipes 15. The steam being blown upward prevents packing of the bone-black, which would otherwise occur, and is otherwise more effective. After about twenty minutes of such use, the steam inlet and exit pipes are closed and hot water admitted, from a suitable source of supply, through inlet pipe 10, the water thus passing, in a reverse direction and downward, through the body of bone black, washing it thoroughly, and is finally discharged through the ports 16ᵇ in the cap 16, passing out through pipe 5 by its terminal 5ª. The bone black being then in purified condition, gelatin liquor or other like material to be clarified and decolorized, is then admitted from a suitable source of supply through the same pipe 10, passing through the body of purified bone black in the container and discharged through the same ports and passages as the hot water. After one or more such applications, when, from the appearance of the treated liquor, it shall be apparent to the operator skilled in the art that the bone-black is "spent", that is to say with its pores filled with absorbed foreign matter from the liquor treated, the machine is then capable of cleaning and revivifying the "spent" bone black, and this without removal and re-burning, or either, by merely repeating the first described operation of cleansing its pores by a volume of live steam blown upward through it, followed by a hot water washing in the reverse direction or downward.

Having thus described my invention I claim as new and desire to secure by Letters Patent:—

1. Apparatus for purifying bone-black and clarifying gelatin liquors and the like, by a continuous operation, comprising in combination a suitable container vessel, filtering devices near its opposite ends, valve-controlled tubular means at its base adapted to discharge steam in an upward direction, a plurality of perforated steam tubes within the container and between the filtering devices thereof, with valve-controlled means to connect the same with a source of steam supply, and tubular means, with valvular devices governing the same, at opposite ends of the container, adapted to lead a volume of hot water and a volume of liquor to be treated, successively, to and from the same, in a downwardly direction.

2. In apparatus of the character recited the combination with a suitable container, of filtering devices near its opposite ends, valve-controlled tubular means adapted to discharge hot water and liquor successively, over the upper filtering device, a chambered cap in the base of the container having a series of perforations adapted to diffuse incoming steam against substantially the whole area of the lower filtering device, and also to discharge liquid therethrough, tubular means mounted in the open end of said cap and a plurality of valves governing the same adapted to control the successive ingress of steam and the discharge of hot water and liquor treated.

3. In apparatus of the character recited the combination with a suitable container of inverted frustoconical form, provided with filtering devices near its opposite ends, tubular means to lead a volume of liquor to be treated and to discharge hot water, alternately, in a downward direction through the container, tubular means at the base of the container, with a plurality of valves governing the same adapted to draw off the liquor treated, and to discharge a current of steam in an upwardly direction through the container, alternately, and a plurality of perforated steam tubes within the container, with valve-controlled means to connect the same with a source of steam supply.

4. Apparatus of the character recited comprising a suitable container vessel of inverted frusto-conical form, having interior filtering devices near its opposite ends, tubular means to lead a volume of hot water and a volume of liquor to be treated, to and from said container in a downward direction, and a plurality of perforated tubular rings arranged in series within the container and between the filtering devices, connecting pipes extending from each of the same through the wall of the container, a steam supply pipe common to each of the same, and valvular means governing each of said perforated tubular rings.

5. Apparatus of the character recited comprising a suitable container of inverted frustoconical form having interior filtering devices near its opposite ends, and a centrally-apertured closing cap, with valve-controlled tubular means mounted in said aperture, deflecting means mounted on said cap below said aperture adapted to diffuse an incoming volume of liquid over the contiguous filtering device, tubular means mounted in an aperture in the base of the container, a perforated cap over said aperture and below the contiguous filtering device, and valvular devices in said tubular means to admit steam or discharge liquid at pleasure.

In testimony whereof, I have hereunto affixed my signature this 16th day of August A. D. 1909.

JOHN HENRY UTLEY.

Witnesses:
  A. M. BIDDLE,
  R. A. DUNLAP.